3,390,180
PURIFICATION OF BIS(ORTHO-DIAMINO-PHENYL) COMPOUNDS

Celeste Michael Fontana, Gainesville, Fla., and Anthony B. Conciatori, Chatham, N.J., assignors to Celanese Corporation, a corporation of Delaware
No Drawing. Filed Apr. 5, 1965, Ser. No. 445,782
9 Claims. (Cl. 260—582)

ABSTRACT OF THE DISCLOSURE

The purification of crude bis(ortho-diamino-phenyl) compounds by means of adding a soluble flocculating agent to an aqueous solution of the crude compound, separating the flocculated impurities, and recovering the purified compound from the solution.

---

This invention relates broadly to the purification of crude precursors of condensation polymers. More particularly it is concerned with the purification of crude precursors (including crude monomers containing reactive amino groups) of linear condensation polymers consisting of recurring structural units containing aromatic nuclei and/or heterogeneous cyclic nuclei with or without intervening atoms or groups such as, for example, O, S, Se, —NH—, or divalent hydrocarbon radicals, for instance the various alkylene (including cycloalkylene), arylene, aralkylene and alkarylene radicals, etc. Still more particularly the invention is directed to the purification of crude precursors of polybenzimidazoles containing coagulable (e.g., water-insoluble, coagulable) impurities that have a detrimental effect upon the properties of a polybenzimidazole made from a precursor of such a polymer.

Taking a crude diaminobenzidine (DAB), e.g., 3,3′-diaminobenzidine, as illustrative of a precursor to be used as a reactant in making a linear condensation polymer, it may first be mentioned that this compound as commercially produced in a dark-brown powder having a melting range of from about 167° C. to about 175° C. It was found that this crude material was entirely unsuitable for use in producing a high-molecular-weight polybenzimidazole. The reason for this was not immediately apparent nor could it be determined from a mere inspection of the material. The present invention is one solution to this problem.

In connection with a study of the problem, consideration was given to the possibility that the difficulty might be due to the presence of some impurity in the crude compound. Accordingly, analytical work was done in an effort to ascertain whether or not an objectionable impurity was present and, if so, the nature of that impurity. From the results of this analytical work it was found that the crude DAB contained an unidentified water-insoluble colloid high in organic matter. The amount of this colloid ranged, for example, from about 5 to 10 percent by weight of the crude DAB. On burning, it left about 1–5 weight percent of an ash consisting mostly of iron oxide.

The problem was solved, in accordance with one embodiment of the invention, by coagulating the above-described impurities in a liquid "solvent" (within which term is included liquid dispersion medium), e.g., water, in which the precursor is soluble but the impurities are insoluble.

After separating the coagulated impurities from the solution by any suitable means, e.g., filtration, centrifuging, or by siphoning, decanting or pumping off the supernatant liquor, etc., the purified precursor is isolated from the solution containing the same. Preferably the purified compound is isolated from the solution thereof after the solution has been contacted with a finely divided or granular decolorizing agent or adsorbent, e.g., activated carbons including boneblack, granulated charcoal, etc., activated alumina, activated bauxite, or any of the other available decolorizing agents. If water or an organic liquid, e.g., alcohol, mixed with a substantial amount of water should be used as the solvent, it will be understood, of course, by those skilled in the art that the chosen decolorizing agent should be one that is not appreciably degraded or changed in its physical structure by contact with water.

In the preferred purification technique, the filtrate obtained after filtering off the coagulated colloid is collected in a steam-jacketed holding tank under a nonoxidizing atmosphere, more particularly an atmosphere of an inert gas, e.g., nitrogen, argon, helium, etc.; and all the ensuing processing steps are carried out under nonoxidizing conditions so as to prevent or minimize oxidative discoloration of the product.

Various means may be used to coagulate the coagulable, specifically water-coagulable, colloid. For instance, although not entirely satisfactory for reasons indicated more clearly in one of the examples that follow, the colloidal impurity may be partly coagulated by boiling a dilute solution of the precursor material in water for several hours and then filtering the solution hot to separate the partly coagulated colloid. When the colloidal impurity is coagulated in this manner the filtration is slow and difficult, often requiring that the filter be changed, and adds greatly to the cost of the purification step.

In another and preferred embodiment of this invention, and which is not the full equivalent of that hereinbefore described (especially that set forth in the preceding paragraph), the coagulable impurities are coagulated in a solution, more particularly an aqueous solution, to which has been added a small amount of a flocculating agent, more particularly such an agent which is at least partly soluble in water, and which is adapted to coagulate the celloidal impurities from "solution" (including colloidal solution and/or dispersion and/or true solution) state. Thereafter the impurities in coagulated state are removed from the solution.

Illustrative examples of flocculating agents that may be employed are soluble metallic salts, especially the water-soluble metallic salts, e.g., the alkali-metal (sodium, potassium, lithium, cesium and rubidium), ammonium, quaternary ammonium and amine salts of the halogen (chlorine, bromine, fluorine and iodine) acids; of the various phosphorus-containing acids, e.g., phosphorous, phosphoric, phosphonic, phosphinic, etc.; of the various sulfur-containing acids, e.g., sulfurous, sulfuric, toluenesulfonic, etc.; of the various nitrogen-containing acids, e.g., nitric, nitrous, etc.; of the aliphatic and halogenated aliphatic monocarboxylic and polycarboxylic acids, e.g., the $C_1$ through $C_{10}$ saturated aliphatic monocarboxylic acids, malonic, succinic, adipic, sebacic, suberic, glutaric, citric, tricarballylic, maleic, fumaric, itaconic, citraconic, mesaconic, aconitic, mono-, di- and trichloracetic, and the various chlorinated propionic acids, etc.; aromatic mono- and polycarboxylic acids, e.g., benzoic, phthalic, terephthalic, isophthalic, etc.

Other examples of flocculating agents include the aluminum salts such as commercial or preferably highly pure alum; soluble ionic polymeric materials such as, for example, partly hydrolyzed polyacrylonitrile, partly hydrolyzed polyacrylamide, hydrolyzed copolymers of acrylonitrile and acrylamide, and hydrolyzed copolymers of acrylonitrile and/or acrylamide with one or more other copolymerizable monomers containing an ethylenic linkage, e.g., at least one, and preferably a single, $CH_2\!=\!C\!<$ grouping, e.g., vinyl acetate, maleic acid, allyl alcohol, acrylic acid, acrylic and methocrylic esters such as the methyl through lauryl esters of the said acids, and the salts, especially the alkali-metal, ammonium, quaternary ammonium and amine salts of the aforementioned polymers.

When the lightness of color of the purified precursor is important, it will be understood by those skilled in the art that it is generally desirable to avoid flocculating agents that may discolor or tend to discolor the purified precursor or polymer made therefrom.

The flocculating agent may be used in finely divided state if it is normally a solid, or it may be added to the solvent (e.g., aqueous solvent) solution of the precursor in the form of a concentrated solution. Preferably it is added to the solvent, as by dissolution therein, in the desired amount prior to dissolving (or dispersing) the crude precursor therein.

Only a relatively small amount of flocculating agent is required. In some cases it may be as low as from 5 to 500 weight parts thereof per million weight parts of the solvent solution of the crude precursor; or it may be up to, for instance, 0.5 or even 1 or more weight percent of the said solution of the crude precursor to be purified. For economical reasons obviously no more of the flocculating agent should be used than is necessary to produce the desired results.

The amount of crude precursor in the liquid medium in which it is dissolved or dispersed may be varied considerably. Thus, if desired, it may constitute as little as 1 or 2% by weight of the said medium up to the saturation concentration of the precursor therein at the boiling point of the liquid medium (e.g., at 100° C. when the liquid medium is water alone). In some cases concentrations of the crude precursor above its saturation point in the liquid medium at the boiling point of the latter may be used thereby to obtain a pumpable slurry. This slurry then may be further diluted, as and when required, to form a solution or dispersion of the precursor in which the flocculating agent will be most effective in precipitating the colloidal impurity. Usually the liquid medium, e.g., water, contains a weight concentration of crude precursor ranging from 1% to about 4%, preferably from about 1% to about 3%. As pointed out hereinbefore, the liquid medium also preferably contains a flocculating agent.

Water alone is the preferred liquid medium in which the crude precursor is dissolved or dispersed. However, mixtures of water and organic solvents also may be used in volume percentages ranging, for instance, from 10:90 of the one to 90:10 of the other, and specifically about 50:50 volume percent of each.

Examples of organic solvents that may be used admixed with water as the liquid medium are various monohydric and polyhydric alcohols, e.g., methyl, ethyl, and propyl and butyl alcohols (both normal and isomeric forms); and glycols, e.g., ethylene glycol, etc. Other examples include hydroxyketones, e.g., diacetone alcohol (4-hydroxy-4-methyl-2-pentanone); and ether-alcohols, e.g., the mono-methyl and mono-ethyl ethers of ethylene glycol and of diethylene glycol, and the diethyl ether of diethylene glycol. Preferably the organic solvent employed in such a combination with water is one that boils below about 200° C. and, more preferably, below about 150° C.

The present invention is believed to be broadly applicable to the purification of crude precursors of the kind described in the second sentence of the first paragraph of this specification, and more particularly to such precursors that can be dissolved (and/or dispersed) in water alone or admixed with an organic solvent and which contain coagulable (including water-insoluble, coagulable) impurities that have a detrimental effect upon the properties of a linear condensation polymer made from such a precursor. The invention is specifically applicable to crude precursors of a polybenzimidazole, which precursors have the aforementioned characteristics.

Illustrative examples of crude precursors that may be purified in accordance with this invention are precursors having the aforementioned characteristics and being compounds having formulas selected from the group consisting of A
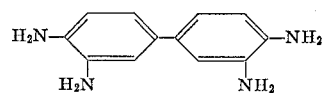

and

B
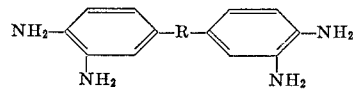

where R represents an intervening atom or group such as, for example, O, S, Se, —NH—, or divalent hydrocarbon radicals, for instance the various alkylene (including cycloalkylene), arylene, aralkylene and alkarylene radicals, etc.

Illustrative examples of divalent hydrocarbon radicals represented by R are the divalent aliphatic (including cycloaliphatic) hydrocarbon radicals, e.g., methylene, ethylene, propylene through dodecylene (both normal and isomeric forms), and higher members of the homologous series, if desired, cyclopentylene, cyclohexylene, cycloheptylene, etc.; divalent aromatic hydrocarbon radicals, e.g., phenylene, naphthylene, etc.; divalent aliphatic-substituted aromatic hydrocarbon radicals, e.g., 2,4-tolylene, ethyl-2,5-phenylene, isopropyl-3,4-phenylene, 1-butyl-2,4-naphthylene, etc.; divalent aromatic-substituted aliphatic hydrocarbon radicals, e.g., phenylethylene, phenylpropylene, naphthylisobutylene, xylylene, alpha-(4-tolylene)-beta'-butyl, etc.; and radicals that may be classed as either divalent aromatic-substituted aliphatic or divalent aliphatic-substituted aromatic hydrocarbon radicals, e.g., 4,alpha-tolylene, 3,beta-phenyleneethyl, 4,alpha-xylylene, 2,gamma-phenylene-butyl, etc. Thus, the divalent hydrocarbon radicals represented by the aforementioned R may be one represented by the formula —Ar—R'—Ar— where Ar represents an arylene radical and R' represents an alkylene radical.

In cases where possible polymerization through, or other reaction through or at a double-bonded carbon atom in an aliphatic chain are unobjectionable during use of the precursor in forming a linear condensation polymer, the divalent hydrocarbon radical represented by R may be a divalent ethylenically-unsaturated aliphatic hydrocarbon radical, e.g., propenylene, isopropenylene, butenylene, cyclopentenylene, cyclohexenylene, etc.; or the ethylenic unsaturation may be in the aliphatic chain of a divalent aliphatic-substituted aromatic hydrocarbon radical as in, for example, allyl-2,5-phenylene; or in the aliphatic chain of a divalent aromatic-substituted aliphatic hydrocarbon radical as in, for instance, phenylpropenylene.

When the crude precursor is one embraced by Formula B, supra, we prefer that R in the said formula be a divalent hydrocarbon radical containing not more than 3 carbon atoms, more particularly a divalent saturated aliphatic hydrocarbon radical containing not more than 3 carbon atoms.

In addition to precursors of high-melting polybenzimidazoles such as those described above by way of illustration, the process of the present invention also may be used in purifying crude precursors of other high-melting linear condensation polymers, more particularly the polyimides, e.g., poly-[N,N'-(p,p'-oxydiphenylene)pyromellitimide], the polybenzothiazoles, e.g., poly-[2,2'-(1,3-phenylene)-6,6'-bibenzothiazole], and the polyquinoxalines, e.g., poly-[2,2'-(1,4-phenylene)-6,6'-biquinoxaline].

In order that those skilled in the art may better understand how the present invention can be carried into effect, the following examples are given by way of illustration and not by way of limitation. All percentages are by weight.

Example 1

A glass column of 30 mm. internal diameter is provided with a bottom filter plate having a very fine porosity, a bottom flow control and a steam-heated jacket. The column is packed to a depth of 59 cm. with pre-boiled, dust-free, 12–40 mesh activated carbon. An ice-cooled, nitrogen-filled receiver is also provided.

A slurry containing about 2.7 wt. percent crude 3,3'-diaminobenzidine (DAB) in water is prepared, boiled from 3 to 4 hours whereby the colloidal impurity in the DAB is partially coagulated, and filtered hot (with considerable difficulty) through fine-porosity filter paper. The hot, clear solution is passed through the carbon-packed column at a rate of 1–2 liters per hour. After initially saturating the column, there is obtained in the above-described receiver white, crystalline DAB having a melting point of 178°–179° C.

Example 2

Seven hundred and twenty (720) grams of crude DAB is slurried in 36 liters of water and 7.0 grams of sodium chloride for 15 minutes at 100° C. in a steam-jacketed kettle. The cloudy slurry containing insoluble material is then pumped in approximately 10 minutes through a flat, disc-shaped filter, 8½ inches in diameter, and which is covered with a flat, disc-shaped filter paper. The filtrate is clear, and light brown to amber in color. It is stored in a steam-jacketed holding tank under nitrogen.

Beginning with the holding tank, all the ensuing processing equipment is kept under an inert atmosphere, specifically nitrogen, to prevent oxidative discoloration of the product.

From the holding tank the hot solution is gravity fed through a bed of a decolorizing agent, specifically charcoal, at a rate of approximately 1 liter per minute. The charcoal bed consists of 10 kilos of charcoal pellets in a steam-jacketed column having a height of 5 feet and an inside diameter of 6 inches. This charcoal bed rests on successive layers of a 1-inch layer of a filter aid, specifically diatomaceous earth, a 1-inch layer of beach sand, and two sheets of fine filter paper, all of which are supported on a porous plate made of steel.

The hot, decolorized solution is cooled to room temperature in a crystallizer, whereupon fine white platelets of pure DAB are deposited. The DAB is isolated from its mother liquor by centrifuging followed by vacuum drying in a nitrogen sweep at 90–100° C. for 24 hours. The isolated product remains white. It contains from 0.0 to 0.3% water, and its M.P. is 178°–179° C.

When the above-described, charcoal-filtration column has been saturated with DAB and is operating continuously under equilibrium conditions, the yield of pure DAB based on the crude product is about 85–95%. The purity of the product is higher than 99%.

Example 3

Examples 1 and 2 are repeated with the exception that, instead of crude 3,3'-diaminobenzidine, there is used in individual runs one of the following crude bis(diaminophenyl)alkanes which, in substantially pure state, are precursors useful in making high-molecular-weight polybenzimidazoles:

1,2-bis(3,4-diaminophenyl)ethane
2,2-bis(3,4-diaminophenyl)propane

Similar results are obtained.

Example 4

Example 2 is repeated with the exception that, instead of using sodium chloride as the flocculating agent, there is employed in individual runs an equivalent amount (approximately 6–8 grams) of one of the following flocculating agents:

Potassium chloride
Sodium sulfate
Sodium nitrate
Sodium trichloroacetate

Similar results are obtained.

Instead of the specific flocculating agents used in Examples 2 and 4, one may employ any other suitable flocculating agent, numerous examples of which have been given hereinbefore. Preferably an alkali-metal chloride and specifically sodium chloride is employed.

From the foregoing description it will be seen that the present invention provides a method of purifying a crude precursor compound, e.g., a crude bis(ortho-diaminoaryl) precursor compound, containing water-insoluble coagulable impurities that have a detrimental effect upon the properties of a condensation polymer made therefrom. In one of the more specific method features of the invention, wherein the precursor compound is selected from compounds having formulas set forth opposite A and B, supra, e.g., 3,3'-diaminobenzidine, the method comprises admixing a hot aqueous solution of the said precursor compound and a flocculating agent, e.g., a metallic halide, more particularly an alkali-metal chloride or other halide. The flocculating agent is present in the admixture in an amount sufficient to coagulate the water-insoluble (more particularly, water-insoluble colloidal) impurities. The coagulated colloid is then removed by suitable means, e.g., by hot filtration. The hot filtrate is decolorized under non-oxidizing conditions, and the decolorized filtrate is cooled under non-oxidizing conditions to deposit crystals of purified precursor compound from the mother liquor. Finally, the deposited crystals are isolated from the mother liquor.

Still more specifically, the instant invention provides a method of purifying crude 3,3-diaminobenzidine to remove water-insoluble colloidal impurities therefrom which comprises dissolving said crude diaminobenzidine in hot water containing sodium chloride in an amount effective in coagulating said impurities; filtering the resulting solution, while hot, to remove the coagulated impurities therefrom; decolorizing the hot filtrate under non-oxidizing conditions by percolation filtration through a bed of a granular decolorizing agent; cooling the decolorized filtrate under non-oxidizing conditions to deposit crystals of purified 3,3'-diaminobenzidine from the mother liquor; separating the deposited crystals from the mother liquor; and drying the separated crystals at an elevated temperature under non-oxidizing conditions.

It is to be understood that the foregoing detailed description is given merely by way of illustration and that many variations may be made therein without departing from the spirit of the invention.

The embodiments of the invention in which an exclusive property or privilege is claimed are defined as follows:

1. The method of purifying a crude bis(orthodiaminophenyl) compound comprising forming a dilute aqueous solution of said compound and a minor amount, as compared to the amount of said crude compound, of a soluble non-discoloring flocculating agent selected from the group consisting of alkali metal salts, ammonium salts, quaternary ammonium salts, amine salts and aluminum salts; separating the flocculated material from said solution; and thereafter isolating the purified compound from said solution.

2. A method as in claim 1 wherein said crude compound is 3,3'-diaminobenzidine.

3. A method as in claim 1 wherein said dilute aqueous solution additionally contains an organic solvent.

4. A method as in claim 1 wherein said flocculating agent is an alkali metal salt.

5. A method as in claim 1 wherein said flocculating agent is sodium chloride.

6. A method as in claim 1 wherein subsequent to separating the flocculated material from said solution, and prior to isolating the purified compound, said solution is decolorized under non-oxidizing conditions.

7. A method as in claim 1 wherein the said aqueous solution contains about 1 to 4% by weight of the bis (ortho-diamino-phenyl) compound based on the weight of said solution.

8. A method as in claim 1 wherein the said flocculating agent is present in an amount of about 1% by weight based on the weight of said crude compound.

9. The method of purifying crude 3,3'-diaminobenzidine to remove water-insoluble colloidal impurities therefrom which comprises dissolving said crude diaminobenzidine in hot water containing sodium chloride in an amount effective in coagulating said impurities; filtering the resulting solution, while hot, to remove the coagulated impurities therefrom; decolorizing the hot filtrate under non-oxidizing conditions by percolation filtration through a bed of a granular decolorizing agent; cooling the decolorized filtrate under non-oxidizing conditions to deposit crystals of purified 3,3' diaminobenzidine from the mother liquor; separating the deposited crystals from the mother liquor; and drying the separated crystals at an elevated temperature under non-oxidizing conditions.

References Cited

UNITED STATES PATENTS

| | | | |
|---|---|---|---|
| 1,903,030 | 3/1933 | Davis | 260—582 |
| 2,194,938 | 3/1940 | Henke et al. | 260—582 |
| 2,744,938 | 5/1956 | Urban | 260—582 |

CHARLES B. PARKER, *Primary Examiner.*

JOSEPH P. BRUST, *Examiner.*

P. C. IVES, *Assistant Examiner.*